US010113786B2

(12) United States Patent
Youbi-Idrissi et al.

(10) Patent No.: US 10,113,786 B2
(45) Date of Patent: Oct. 30, 2018

(54) METHOD OF MANAGING THE OPERATION OF A REFRIGERATED TRUCK FOR TRANSPORTING HEAT-SENSITIVE PRODUCTS BY MODIFYING THE REFRIGERATION POWER

(71) Applicant: L'Air Liquide, Societe Anonyme pour l'Etude et l'Exploitation des Procedes Georges Claude, Paris (FR)

(72) Inventors: Mohammed Youbi-Idrissi, Massy (FR); Antony Dallais, Janvry (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 185 days.

(21) Appl. No.: 15/023,247

(22) PCT Filed: Aug. 28, 2014

(86) PCT No.: PCT/FR2014/052135
§ 371 (c)(1),
(2) Date: Mar. 18, 2016

(87) PCT Pub. No.: WO2015/040301
PCT Pub. Date: Mar. 26, 2015

(65) Prior Publication Data
US 2016/0231042 A1    Aug. 11, 2016

(30) Foreign Application Priority Data
Sep. 18, 2013   (FR) ..................................... 13 58956

(51) Int. Cl.
F25D 25/00    (2006.01)
F25D 3/10     (2006.01)
(Continued)

(52) U.S. Cl.
CPC ......... *F25D 3/105* (2013.01); *B60H 1/00378* (2013.01); *B60H 1/3202* (2013.01); *B60P 3/20* (2013.01); *F25D 7/00* (2013.01)

(58) Field of Classification Search
CPC ......... F25D 3/105; F25D 7/00; B60H 1/3202; B60H 1/00378; B60P 3/20
(Continued)

(56) References Cited

U.S. PATENT DOCUMENTS 5,267,446 A * 12/1993 Viegas ................. B60H 1/3202
62/167
5,287,705 A    2/1994 Roehrich et al.
(Continued)

FOREIGN PATENT DOCUMENTS

EP    0 599 610    6/1994

OTHER PUBLICATIONS

International Search Report and Written Opinion for PCT/FR2014/052135, dated Nov. 18, 2014.
French Search Report for FR 1 358 956, dated Jun. 17, 2014.

*Primary Examiner* — Frantz Jules
*Assistant Examiner* — Steve Tanenbaum
(74) *Attorney, Agent, or Firm* — Yan Jiang

(57) ABSTRACT

A method for managing the operation of a refrigerated truck for transporting heat-sensitive products, of the indirect-injection type, in which the parameter $\Delta T = T_{air\ inlet} - T_{setpoint}$ ($T_{air\ inlet}$: temperature of the air coming into contact with the heat exchanger internal to the truck as a result of the action of the fan, $T_{setpoint}$: temperature to be set in the chamber inside the truck) is determined in real time and in which if $\Delta T$ is greater than an upper setpoint value $\Delta T_{setpoint\ H}$, a rapid-pressurization (RMP) circuit is activated to vaporize some cryogen and thus increase the pressure in the head of gas above the reserve of cryogen of the truck.

4 Claims, 3 Drawing Sheets

(51) Int. Cl.
*B60P 3/20* (2006.01)
*B60H 1/00* (2006.01)
*B60H 1/32* (2006.01)
*F25D 7/00* (2006.01)

(58) Field of Classification Search
USPC .......................................................... 62/62
See application file for complete search history.

(56) References Cited

U.S. PATENT DOCUMENTS

| | | | |
|---|---|---|---|
| 5,320,167 A * | 6/1994 | Johnson | B60H 1/3202 |
| | | | 165/61 |
| 5,365,744 A | 11/1994 | Viegas et al. | |
| 2003/0029179 A1 | 2/2003 | Vander Woude et al. | |

\* cited by examiner

METHOD OF MANAGING THE OPERATION OF A REFRIGERATED TRUCK FOR TRANSPORTING HEAT-SENSITIVE PRODUCTS BY MODIFYING THE REFRIGERATION POWER

CROSS-REFERENCE TO RELATED APPLICATIONS

This application is a § 371 of International PCT Application PCT/FR2014/052135, filed Aug. 28, 2014, which claims § 119(a) foreign priority to French patent application FR1358956, filed Sep. 18, 2013.

BACKGROUND

Field of the Invention

The present invention relates to the field of the transport and distribution of heat-sensitive products, such as pharmaceutical products and foodstuffs, and relates very particularly to technologies where the cold necessary for maintaining the temperature of the products is supplied by a cryogenic unit that operates in an open loop and implements:
- direct injection of a cryogenic fluid into the transport case (very often liquid nitrogen);
or
- what is known as "indirect" injection of a cryogenic fluid into the transport case (very often liquid nitrogen), said "indirect" technique often being referred to as "CTI" and employing one or more heat exchanger(s) in the internal enclosure in which the products are transported (also known as "chamber", "box", isothermal "case", etc.), the cryogenic fluid (such as liquid nitrogen or liquid $CO_2$) flowing through said heat exchanger, the enclosure furthermore being provided with an air circulation system (fans) that brings this air into contact with the cold walls of the heat exchanger, thereby making it possible to cool the air inside the cold chamber of the truck, the cryogenic fluid feeding the heat exchanger(s) coming from a cryogen reservoir that is traditionally situated under the truck (the reservoir itself being fed, when this is necessary, from an upstream reservoir that is fixed or movable but in any case not attached to the vehicle).

Throughout the following text, the term "reservoir" will denote the on-board cryogen reservoir, unless a specification such as "upstream" or "fixed" denotes a different reservoir.

The atmospheres maintained inside the cold chamber can be provided both for fresh produce (typically a temperature of around 4° C.) and for frozen foods (typically a temperature of around −20° C.).

The present invention relates more particularly to cryogenic solutions involving indirect injection but the solutions proposed can be applied very advantageously to cryogenic units involving direction injection of nitrogen, $CO_2$ or any other cryogen.

Related Art

In the case of indirect injection, the heat removed from the air first of all allows complete evaporation of the cryogenic fluid flowing through the heat exchanger, then a rise in its temperature until it reaches a temperature close to that of the enclosure. The cryogenic fluid is then expelled to the outside after having transferred a maximum of cooling energy.

The method typically implemented in such trucks that operate with direct or indirect injection is most frequently controlled as follows:

1—while the refrigeration system of the truck is being started up (for example at the start of a round or after a lengthy shutdown of the refrigeration system for any reason) or after the opening of a door, a rapid temperature-drop mode is adopted (this phase is known as "pull-down" in this industry).

2—once the setpoint temperature has been reached in the product storage chamber, a control/regulation mode is adopted, making it possible to maintain the temperature in the product storage chamber at the setpoint value ("holding").

However, the refrigeration needs in each of these two phases, in terms of refrigeration power required, are extremely different.

Specifically, in the "pull-down" phase, there is often a demand for the temperature of the air in the chamber to drop rapidly. In order to obtain this effect, it is necessary to provide high refrigeration power that is capable of overcoming the thermal inertia of the entire system (air, cryogenic unit, walls of the truck) and the inlet of heat through the walls of the truck and via the opening of its doors. These refrigeration needs drop dramatically in the holding phase, given that only the inlet of heat through the walls continues.

In other words, the refrigeration needs of a truck during a given round fluctuate between two levels which can be referred to as "full load" and "partial load", as the appended FIG. 1 clearly shows.

While the refrigeration power during the holding phase absolutely has to reach a required minimum level, that corresponding to the full load remains at the discretion of the designer of the refrigeration system within the standards applied in this field (ATP, DIN, etc.) that recommend a power of the installed refrigeration unit of at least equal to 1.75 times the power at partial load, this power mainly being dictated by the heat input through the walls (KSΔT). Clearly, the greater the full load power, the more a drop and rapid return of the air temperature inside the chamber to the setpoint temperature can be ensured.

Existing cryogenic systems operate for example with "nominal" pressure in the reservoir at a virtually fixed level of around 3.2 barg. Operational modularity is currently most frequently obtained through regulation of the valves for injecting the liquid in the all or nothing ("AON") mode or in the proportional mode.

The appended FIG. 2 illustrates the schematic diagram of pressure regulation of the reservoir as commonly carried out at present in this field.

It shows what a person skilled in art is familiar with: the feed path EV LIN CTI for liquid to the heat exchanger(s) inside the chamber of the truck, and a path known as "RMP" ("rapid pressurization") for repressurizing the atmosphere of the reservoir.

This operation has a number of drawbacks:
1—if the pressure is lower than the required level during the filling of the reservoir (this occurring frequently in practice), the power that the cryogenic unit is supposed to produce decreases rapidly. This results in a fairly long "pull-down" time and overconsumption that is harmful to the economic balance of the system. The appended FIG. 3 illustrates these phenomena, giving results of experiments that show this variation in pressure on account of the variation in the pressure in the reservoir;
2—since operation takes place at a fixed reservoir pressure, the extent of the modularity (the difference between the full load power and partial load power) remains limited with overconsumption of the cryogen on account of the effects of thermal inertia in the system. In other words, it is very difficult to achieve a "boost" mode in which a very high refrigeration power is sought;

3—the nominal pressure in the reservoir as is conventionally used today (for example 3.2 barg) lengthens the filling time from the upstream fixed large store (source), which is generally kept at around 4 barg. This results in a loss of cryogen during filling in the form of gas (gas flash) since the difference in pressure between the fixed and movable reservoirs remains low, hence a long filling time (typically 10 to 15 min).

SUMMARY OF THE INVENTION

The present invention therefore proposes a modification to the configuration of the reservoir of the truck, and notably to what is traditionally referred to as its "valve box" in the gas business, so as to provide greater modularity in terms of refrigeration power of the cryogenic units while optimizing their consumption of cryogen.

DETAILED DESCRIPTION

As will become more clearly apparent from the following text, the invention proposes modifying the operating conditions of the reservoir that are currently used, so as to allow it to operate at a variable pressure which adapts automatically to the refrigeration needs of the truck. To this end, the work carried out by the Applicant company has revealed that two modifications prove to be very particularly advantageous:

1—lowering the "nominal" pressure in the on-board reservoir to a pressure of no more than 2 barg, and preferably to 1.5 barg for cryogenic units involving indirect injection and to 1 barg for cryogenic units involving direct injection. This first modification is easy to carry out, for example by modifying the calibration of a backpressure regulator to the desired value, said backpressure regulator being positioned correctly on a connected line.

2—connecting a system for rapid pressurization of the reservoir, which is activated when required, making it possible to increase the pressure in the reservoir when required by the procedure, and thus to ensure a higher flow rate of cryogen coming from this reservoir, resulting in a greater refrigeration power.

Since the need for power by the system is variable and directly linked to the operating phase (full load or partial load), the device proposed should allow variable use of the cryogen pressure in the reservoir in an optimal manner.

Figure 4:
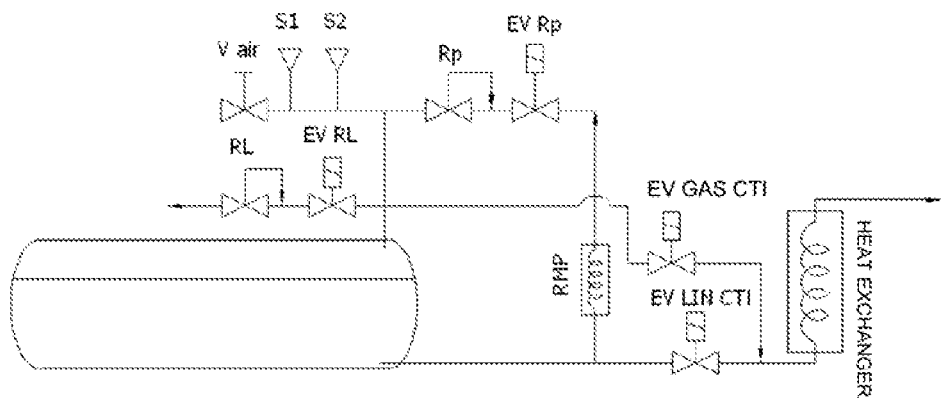
FIG. 4 provides the schematic diagram of an exemplary embodiment of the pressure regulation of the reservoir according to the invention.

The appended FIG. 4 illustrates an embodiment of the invention.

By default, the pressure in the reservoir is kept at what is known as nominal pressure, that is to say a low pressure, for example between 1.5 barg and 2 barg. This pressure is maintained by the backpressure regulator RL equipped on its upstream side with a normally open solenoid valve (EV RL).

When the demand for pressure to be supplied is high (notably during the "pull-down" phase or after the opening of doors), the rapid pressurization circuit RMP is activated. The solenoid valve EV Rp opens and the solenoid valve EV RL closes. A quantity of cryogen is vaporized via the pressurization heater RMP, which has the effect of increasing the pressure in the gaseous atmosphere of the reservoir. The backpressure regulator Rp is regulated to remain open up to a pressure setting for example around 4 barg. The circuit RMP is designed to ensure an increase in pressure in the reservoir over a time compatible with the "pull-down" time of the chamber to be cooled.

This pressurization circuit is activated for as long as the demand for power is high.

When the demand for power decreases, i.e. either in the "pull down" end phase or in the "partial load" (holding) phase, the circuit RMP is deactivated.

At this stage, the pressure in the reservoir is at a peak, for example around 4 barg.

Under these conditions, the need for power is low, it can then be advantageous to use the available sensible heat of the gas to partially provide the power to the cooling system, the circuit EV gas is then activated. The pressurized gas is injected into the heat exchanger: EV Rp is closed, EV LIN CTI is closed and EV Gas CTI is opened until the low pressure level is obtained. This valve EV Gas CTI is then closed and the valve EV LIN CTI is opened.

This manner of operation makes it possible to combine two functions and to increase the efficiency of the solution:

1—The depressurization of the reservoir in the heat exchanger without loss of enthalpy, and without venting;

2—The use of the sensible heat of the gas in the partial load phase.

The automatic management of regulation is carried out by suitable method control that a person skilled in the art will understand here without the need for more details. The pressure thresholds are determined in order to optimize the need for refrigeration power to be supplied and to ensure the integrity of the reservoir and that the consumption of the system is optimized.

To this end, the temperature for example will be used as an indicator of the operating phase. More specifically, the temperature difference between the air intake temperature (at the inlet of the heat exchanger CTI) and the desired setpoint temperature will be monitored for example continuously:

$$\Delta T = T_{inlet\ air} - T_{setpoint}$$

($T_{inlet\ air}$: the temperature within the air coming into contact with the heat exchanger on account of the action of the ventilation)

($T_{setpoint}$: desired temperature inside the product storage chamber)

The full load mode is characterized by a high value of $\Delta T$, typically greater than 5K. In this mode, the pressure should be at its maximum level in order to deliver the maximum refrigeration power.

When this difference $\Delta T$ is for example strictly less than 2K, the system is considered to be in partial load operation.

In this mode, the pressure can be at its minimum level, i.e. a minimum flow rate of liquid cryogen and a minimum refrigeration power.

Between the two temperature difference levels, the system is considered to be in transition from one mode to another, the pressure can also be at an intermediate level between the two high and low pressure levels.

Figure 5:
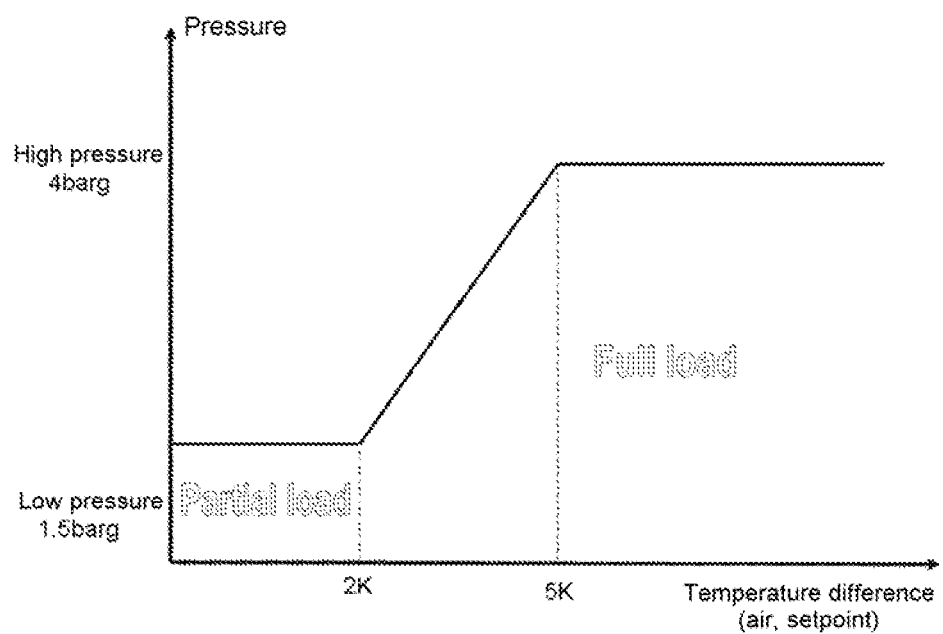
FIG. 5 shows the variation in pressure in the reservoir depending on the operating mode of the refrigeration system, i.e. on the need for refrigeration power.

FIG. 5 shows a schematic depiction of these three operating modes, the temperature difference and the associated pressure level.

Figure 3:
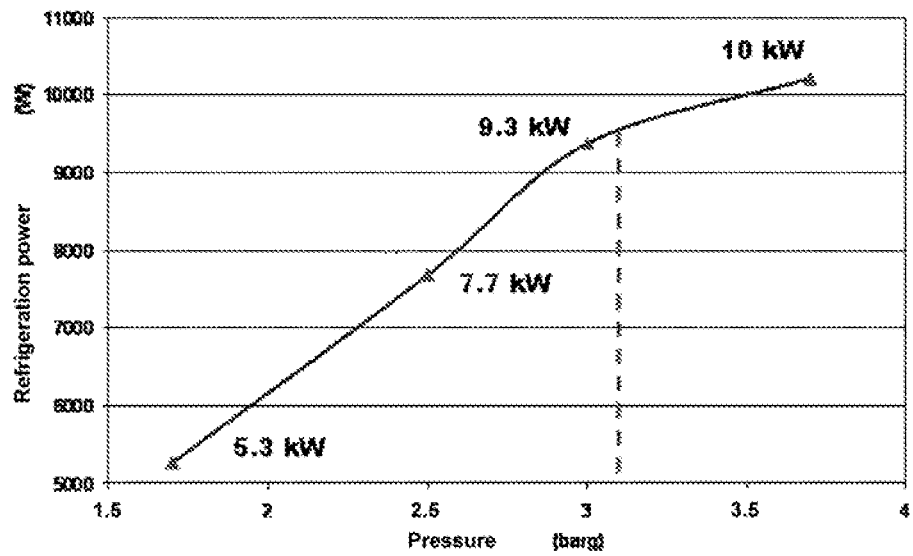
FIG. 3 shows the variation in refrigeration power depending on the pressure in the reservoir.

Depending on the pressure in the reservoir and the temperature difference measured in real time, the rapid pressurization system is then activated, or not, until the desired pressure is obtained as indicated in FIG. 3: in accordance with the diagram in FIG. 4, the solenoid valve EV Rp is open and the solenoid valve EV RL is closed.

If, by contrast, the pressure in the reservoir is above that which is required, the reservoir is depressurized by using the saturated vapor in its gaseous atmosphere to feed the heat exchangers CTI: in accordance with the diagram in FIG. 4, EV Rp is closed and EV Gas CTI is opened until the low pressure level required is obtained. This valve EV Gas CTI is then closed and the valve EV LIN CTI is opened again.

Figure 1:
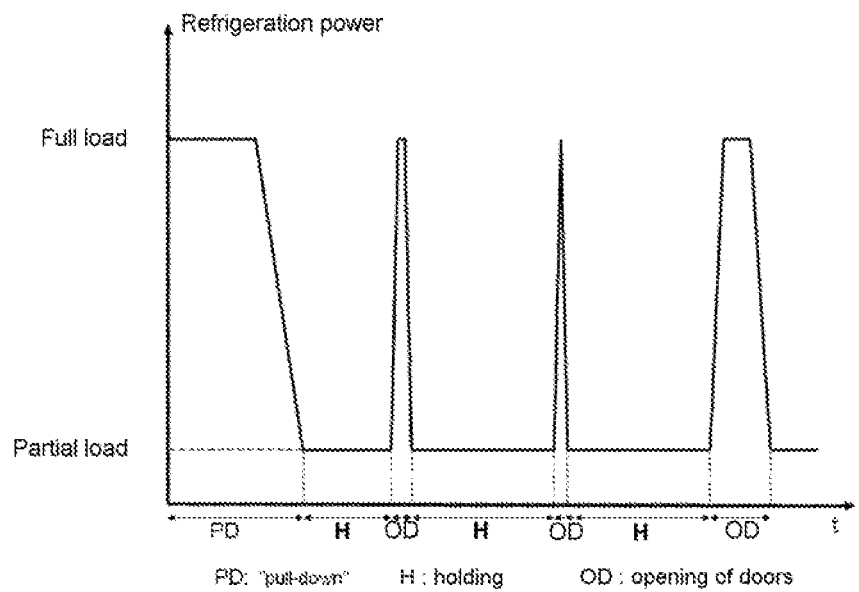
FIG. 1 shows the variation in refrigeration needs of a truck depending on its operating phases.
Figure 2:
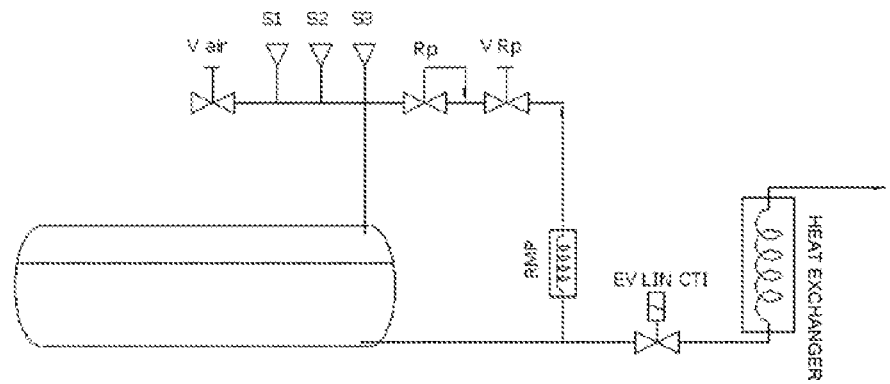
FIG. 2 illustrates the schematic diagram of pressure regulation of the reservoir as is currently used in this field.

Thus, by providing all the operational flexibility that is desired, as explained above, the system proposed by the present invention is easy to use compared with the system currently used in this field as illustrated in FIG. 2: it only requires the installation of two additional solenoid valves controlled by the same control system that is already present on existing installations. The cost incurred by this modification is raised very little compared with the savings in consumption that are obtained.

The present invention thus relates to a method for managing the operation of a refrigerated truck for transporting heat-sensitive products, of the indirect injection type, where the truck is provided:

with at least one chamber for storing the products,
with a reserve of cryogenic fluid such as liquid nitrogen,
with a heat exchanger system inside said at least one chamber, the cryogenic fluid flowing through said heat exchanger system,
with an air circulation system, for example of the fan type, that is able to bring the air inside the chamber into contact with the cold walls of the heat exchanger system,
with temperature sensors that are able to determine the temperature of the atmosphere inside said at least one chamber ($T_{int}$) for the one part and that of the air coming into contact with the internal heat exchanger on account of the action of the ventilation ($T_{inlet\ air}$),
with a circuit for rapid pressurization (RMP) of said reserve, said circuit comprising a line that is connected in its upstream part to the liquid phase stored in said reserve and in its downstream part to the gas phase stored in said reserve, said line comprising a heat exchanger/heater (RMP), a valve (EV Rp) and a back-pressure regulator (Rp);
and also with a management and control unit which is able to regulate the internal temperature $T_{int}$ to a setpoint value $T_{setpoint}$,
characterized by the implementation of the following measures:
the value $\Delta T=T_{inlet\ air}-T_{setpoint}$ is determined in real time;
if $\Delta T$ is greater than a top setpoint value $\Delta T_{setpoint\ H}$, the rapid pressurization circuit RMP is activated by opening said valve of the pressurization circuit (EV Rp) so as to vaporize some of the cryogen in said heat exchanger/heater and thereby increase the pressure in the gaseous atmosphere in the reserve.

According to one of the aspects of the invention, when $\Delta T$ drops below a bottom setpoint value $\Delta T_{setpoint\ B}$, the rapid pressurization circuit RMP is then deactivated by closing said valve of the pressurization circuit (EV Rp).

According to another of the embodiments of the invention, provision is made of a gas circuit, said circuit comprising a gas line connected in its upstream part to the gas phase stored in said reserve and in its downstream part to a line that feeds said heat exchanger inside the chamber, said line comprising a gas valve (EV Gas CTI), and when $\Delta T$ drops below a bottom setpoint value $\Delta T_{setpoint\ B}$, the rapid pressurization circuit RMP is deactivated and the gas circuit is activated by opening said gas valve (EV Gas CTI) so as to feed gas to said heat exchanger inside the chamber, said gas feed being maintained until a low pressure level is obtained in said reserve.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for managing the operation of a refrigerated truck for transporting heat-sensitive products, of the indirect injection type, where the truck includes
at least one chamber for storing the products,
a reserve of cryogenic fluid, a heat exchanger, a fan, at least one temperature sensor, the heat exchanger disposed inside said at least one chamber, cryogenic fluid flowing through said heat exchanger system, and a circuit for pressurization of said reserve, said circuit comprising a line with an upstream portion that is connected to a liquid phase of said cryogenic fluid stored in said reserve and a downstream portion that is connected to gas phase of said cryogenic fluid stored in said reserve, said line including a heater, a valve (EV Rp), and a backpressure regulator (Rp), said method comprising the steps of:

using said fan to bring air inside said at least one chamber into contact with cold walls of said heat exchanger system, determining, with said at least one temperature sensor, a temperature ($T_{inlet\ air}$) of air coming into contact with said cold walls on account of said use of said fan;

regulating an internal temperature ($T_{int}$) of said at least one chamber to a setpoint value ($T_{setpoint}$) by:

determining, in real time a value $\Delta T$ equal to the difference between the temperature ($T_{inlet\ air}$) of air coming into contact with said cold walls on account of said use of said fan and the setpoint value ($T_{setpoint}$), and activating said pressurization circuit by opening said valve so as to vaporize some of the liquid phase of said cryogenic fluid inside said heater if $\Delta T$ is greater than a top setpoint value ($\Delta T_{setpoint\ H}$), the vaporization of said liquid phase causing an increase in a pressure of a gas phase in said reserve.

2. The management method of claim 1, wherein:

the truck includes a gas line having an upstream portion connected to the gas phase of said reserve and a downstream portion connected to a liquid line that feeds a liquid phase of said cryogenic fluid to said heat exchanger system, said gas line including a gas valve (EV Gas CTI); and when $\Delta T$ drops below a bottom setpoint value ($\Delta T_{setpoint\ B}$), said rapid pressurization circuit is deactivated and said gas circuit is activated by opening said gas valve (EV Gas CTI) of said gas line so as to feed gaseous cryogen to said heat exchanger system and maintain said gaseous cryogen feed until the pressure in the vessel drops to a specified level is obtained in said reserve.

3. The management method of claim 1, wherein when $\Delta T$ drops below a bottom setpoint value ($\Delta T_{setpoint\ B}$), said rapid pressurization circuit is deactivated by closing said valve (EV Rp) of said pressurization circuit.

4. The management method of claim 1, wherein the cryogenic fluid is nitrogen.

* * * * *